United States Patent
Riebling et al.

[15] 3,650,779
[45] Mar. 21, 1972

[54] FLUORIDE GLASSES CONTAINING XENON

[72] Inventors: Eugene F. Riebling; Paul E. Blaszyk, both of Horseheads; Dennis W. Smith, Corning, all of N.Y.

[73] Assignee: Corning Glass Works, Corning, N.Y.

[22] Filed: Feb. 24, 1969

[21] Appl. No.: 801,754

[52] U.S. Cl....................106/47 R, 252/62.51, 252/301.4 R, 252/518, 252/521
[51] Int. Cl......................C03c 3/00, C09k 1/0, C04b 35/00
[58] Field of Search.............106/47; 252/301.4, 62.51, 62.3, 252/518; 331/94.5; 23/205

[56] References Cited

UNITED STATES PATENTS

| | | | |
|---|---|---|---|
| 2,511,224 | 6/1950 | Sun et al.................................106/47 |
| 2,716,069 | 8/1955 | Pincus....................................106/47 |
| 2,819,977 | 1/1958 | De Paolis..............................106/47 |
| 2,901,362 | 8/1959 | Pincus....................................106/47 |

OTHER PUBLICATIONS

Deutschbein, Otto, Glass for Lasers, Chemical Abstracts, Vol. 69, 1968, 79 884x, abstract of French Patent 1,502,709, 24 Nov. 1967

*Primary Examiner*—James E. Poer
*Assistant Examiner*—M. Bell
*Attorney*—Clarence R. Patty, Jr. and Clinton S. Janes, Jr.

[57] ABSTRACT

This invention relates to the production of low melting fluoride glasses containing oxidized xenon and, more particularly, to the production of fluoroberyllate glasses containing Xe(VI).

4 Claims, No Drawings

FLUORIDE GLASSES CONTAINING XENON

Rare gas compounds were first prepared in 1962 with the discovery of $XePtF_6$ and $XeF_4$. In the intervening years to date, many other analogous compounds have been produced, e.g., $XeF_2$, $XeF_6$, $XeO_4$, $Na_4XeO_6$, $XeO_3$, $Cs_2XeF_8$, $RbXeF_7$, $Rb_2XeF_8$, $CsXeF_7$, $CsF \cdot XeOF_4$, and $3KF \cdot XeOF_4$. Thus, German Pat. No. 1,179,917 and U.S. Pat. No. 3,192,016 describe the preparations of $XeF_4$ and $XeF_6$, respectively. Laboratory studies have demonstrated that some compounds containing hexavalent xenon can be stable up to about 450° C. In the main, such compounds have contained large alkali metal ions, notably rubidium and cesium, and halides, commonly fluoride and chloride. There appears to be an inverse relationship between cation size (field strength) and a compound's thermal stability for those compounds containing hexavalent xenon [Xe(VI)].

We have now discovered that low melting alkali fluoroberyllate glasses can be prepared which contain oxidized xenon. Many alkali beryllium fluoride base compositions exhibit liquidus temperatures below about 450° C., remain relatively fluid at temperatures between about 450°-500° C., and at the same time demonstrate glass forming characteristics resulting from the presence of $BeF_2$. Therefore, these compositions can provide stable environments for species of oxidized xenon such as Xe(VI), particularly where the alkali metal is one of the large cations $Rb^+$ or $Cs^+$. Such glasses may display unusual optical, magnetic, and electrical properties and have been considered for laser applications.

Because of the extreme vaporization of xenon-containing materials at temperatures much above about 500° C., the base glass formulations should exhibit a low viscosity at temperatures below 500° C. We have found that the following base glass forming composition fields will yield relatively fluid melts (less than about $10^4$ poises) at temperatures under about 500° C.: $RbF-BeF_2$, $CsF-BeF_2$, $CsF-RbF-BeF_2$, $CsF-AlF_3-BeF_2$, $CaF_2-AlF_3-CsF-BeF_2$, $CsF-CaF_2-BeF_2$, and RF and/or $RHF_2-TlF$ and/or $TlHF_2-BeF_2$, wherein R consists of $Li^+$ and/or $Na^+$. These composition areas provide useful glass matrices for the incorporation of oxidized xenon therein.

We have employed two general methods for making glasses of this invention. The first and preferred method contemplates three steps: $XeF_6$ is prepared in accordance with known techniques; the solid $XeF_6$ is reacted with CsF and/or RbF to yield $CsXeF_7$ and/or $RbXeF_7$; and, finally, the xenon salt is mixed with and dissolved into the base glass matrix. The second method also comprises three steps: $XeF_6$ is prepared in accordance with known techniques; the solid $XeF_6$ is reacted with powdered glass of the desired base composition; and, then the $XeF_6$ enriched glass is mixed with additional base glass material and melted together.

Various embodiments of our preferred method for manufacturing glasses of this invention are possible. One such embodiment constitutes vaporizing $XeF_6$ in a Monel metal chamber and transpiring the vapor onto powdered RbF and/or CsF located in a liquid nitrogen cooled, closed end Kel—F or Teflon reactor. The mixture is heated to about 60° C. to produce the double salt $RbXeF_7$ and/or $CsXeF_7$. The double salt powder is then combined with the base glass in one of three ways: First, the glass batch ingredients are melted together, the melt cooled to a glass and pulverized, and the double salt powder and the glass particles mixed together, heated in a Monel metal or platinum container to a homogeneous melt, and then cooled to a glass. Second, the glass batch ingredients are melted together in a Monel metal or platinum crucible, the double salt powder is heated in a Monel metal or platinum crucible at an elevated temperature lower than the glass melting temperature, the molten glass poured over the salt powder, and then cooled to a glass. Third, the glass batch ingredients are melted together in a Monel metal or platinum crucible, the double salt powder is placed on top of the molten glass, additional molten glass poured over the salt powder, and then cooled to a glass.

These three mixing techniques balance the need to have a relatively fluid base glass melt (for ease of mixing) containing large cations (enhanced thermal stability of the hexavalent xenon) with the need to employ a short mixing time at temperatures since $2Cs_2XeF_7 \rightarrow Cs_2XeF_8 + XeF_6(gas)$ at 150°-260° C. and $Cs_2XeF_8 \rightarrow 2CsF + Xe + XeF_4 + F_2$ at 450°-580° C.

The second general method we have utilized in manufacturing glasses of this invention comprises three steps: First, $XeF_6$ is vaporized in a Monel metal chamber and transpired onto powders of the desired base glass located in a liquid nitrogen cooled, closed end Kel—F or Teflon reactor. Second, the mixture is heated to about 60° C. to react the $XeF_6$ with large cations and fluoride ions present in the glass surface. Third, the $XeF_6$-enriched material is melted in a Monel metal or platinum crucible or mixed with more glass powder and then re-melted in a Monel metal or platinum crucible.

In each of these methods an inert atmosphere such as dry helium, dry argon, or dry nitrogen is required in the heating steps. The time for homogenizing the $XeF_6$-containing powder and the base glass at elevated temperatures should not exceed about 10 minutes and, preferably, is less than 5 minutes inasmuch as vaporization and decomposition occur even at the 300° C. melting points of the thallium-containing glasses.

Chemical analyses employing iodometric titration to determine the oxidizing power of Xe(VI), have demonstrated that glasses containing up to 10 percent by weight of $XeF_6$ can be produced utilizing the above-recited base glass composition areas. Thus, in the $RbF-BeF_2$ and $CsF-BeF_2$ binary systems, good glasses were produced wherein the alkali content ranged about 20-40 mole percent RbF or CsF. In the $RbF-CsF-BeF_2$ ternary system, about 80-90 mole percent $BeF_2$ was required with the individual alkali contents having no substantive effect. In the $CsF-AlF_3-BeF_2$ ternary system, good glasses were found employing about 5-15 mole percent $AlF_3$, 10-50 mole percent CsF, and 40-80 mole percent $BeF_2$. Glasses in the quaternary system $CaF_2-AlF_3-CsF-BeF_2$ were produced utilizing about 5-15 mole percent $CaF_2$, 5-15 mole percent $AlF_3$, 10-40 mole percent CsF, and 40-80 mole percent $BeF_2$. In the ternary system $CsF-CaF_2-BeF_2$, glasses were prepared employing about 20-40 mole percent CsF, 5-15 mole percent $CaF_2$, and 50-80 mole percent $BeF_2$. We were also able to produce glasses in the composition system RF and/or $RHF_2-TlF$ and/or $TlHF_2-BeF_2$, wherein R consists of $Li^+$ and/or $Na^+$, consisting essentially of about 15-35 mole percent RF and/or $RHF_2$, 15-30 mole percent TlF and/or $TlHF_2$, and 45-70 mole percent $BeF_2$. This latter ternary system is particularly useful in the present invention since the softening points of the glasses produced can be lower than 300° C. This feature permits the solution of $XeF_6$-containing material therein with much less vaporization and decomposition thereof than in the former systems having higher softening points.

Inasmuch as the oxidizing power of Xe(VI) is extremely great, and its propensity for decomposition significantly high, batch ingredients of high purity were utilized in the base glass compositions. Hence, reagent grade CsF, RbF, TlF, $BeF_2$, etc., were employed to reduce the possibility of incorporating a deleterious contaminant. The batch materials for the TlF and $TlHF_2$ glasses were melted at temperatures ranging about 350°-550° C., whereas the batches for the other glasses required melting temperatures of 500°-650° C. The annealing points of glasses within the ternary systems $RF-TlF-BeF_2$ and $RHF_2-TlHF_2-BeF_2$ were measured as low as 60° C. with softening points at about 100° C. Yet, these glasses were reasonably stable in the ambient atmosphere at room temperature.

Our preferred base glass consists of about 25 mole percent $NaHF_2$, 25 mole percent $TlHF_2$, and 50 mole percent $BeF_2$. The batch materials were melted at 350° C. and the resulting glass was relatively soft at 100° C. with an annealing point of about 60° C. The good fluidity of these glasses at temperatures below 300° C. renders them especially suitable for solution of $XeF_6$-containing materials therein.

We claim:
1. An alkali fluoroberyllate glass containing Xe(VI).
2. An alkali fluoroberyllate glass according to claim 1 having a base glass composition selected from the group consisting of $RbF-BeF_2$, $CsF-BeF_2$, $CsF-RbF-BeF_2$, $CsF-AlF_3-BeF_2$, $CaF_2-AlF_3-CsF-BeF_2$, $CsF-CaF_2-BeF_2$, and RF and/or $RHF_2-TlF$ and/or $TlHF_2-BF_2$ wherein R consists of $Li^+$ and/or $Na^+$.
3. An alkali fluoroberyllate glass according to claim 2 wherein said base glass is selected from the group of compositions consisting essentially of 20–40 mole percent RbF and 60–80 mole percent $BeF_2$; 20–40 mole percent CsF and 60–80 mole percent $BeF_2$; 10–20 mole percent RbF and/or CsF and 80–90 mole percent $BeF_2$; 10–50 mole percent CsF, 5–15 mole percent $AlF_3$, and 40–80 mole percent $BeF_2$; 5–15 mole percent $CaF_2$, 5–15 mole percent $AlF_3$, 10–40 mole percent CsF, and 40–80 mole percent $BeF_2$; 20–40 mole percent CsF, 5–15 mole percent $CaF_2$, and 50–80 mole percent $BeF_2$; and 15–35 mole percent RF and/or $RHF_2$, 15–30 mole percent TlF and/or $TlHF_2$, and 45–70 mole percent $BeF_2$.
4. An alkali fluoroberyllate glass according to claim 3 containing up to about 10 percent by weight of $XeF_6$.

* * * * *